F. AMTHOR.
TEMPERATURE OPERATED DEVICE.
APPLICATION FILED FEB. 16, 1916.
1,331,553.
Patented Feb. 24, 1920.
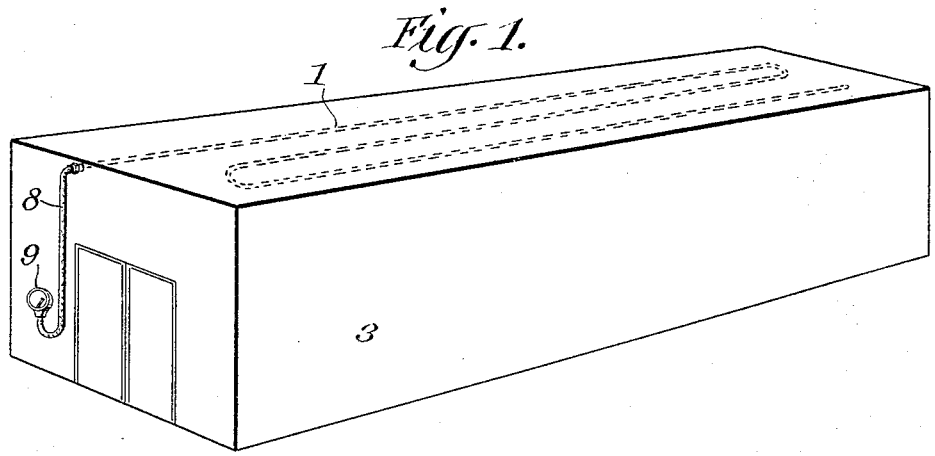
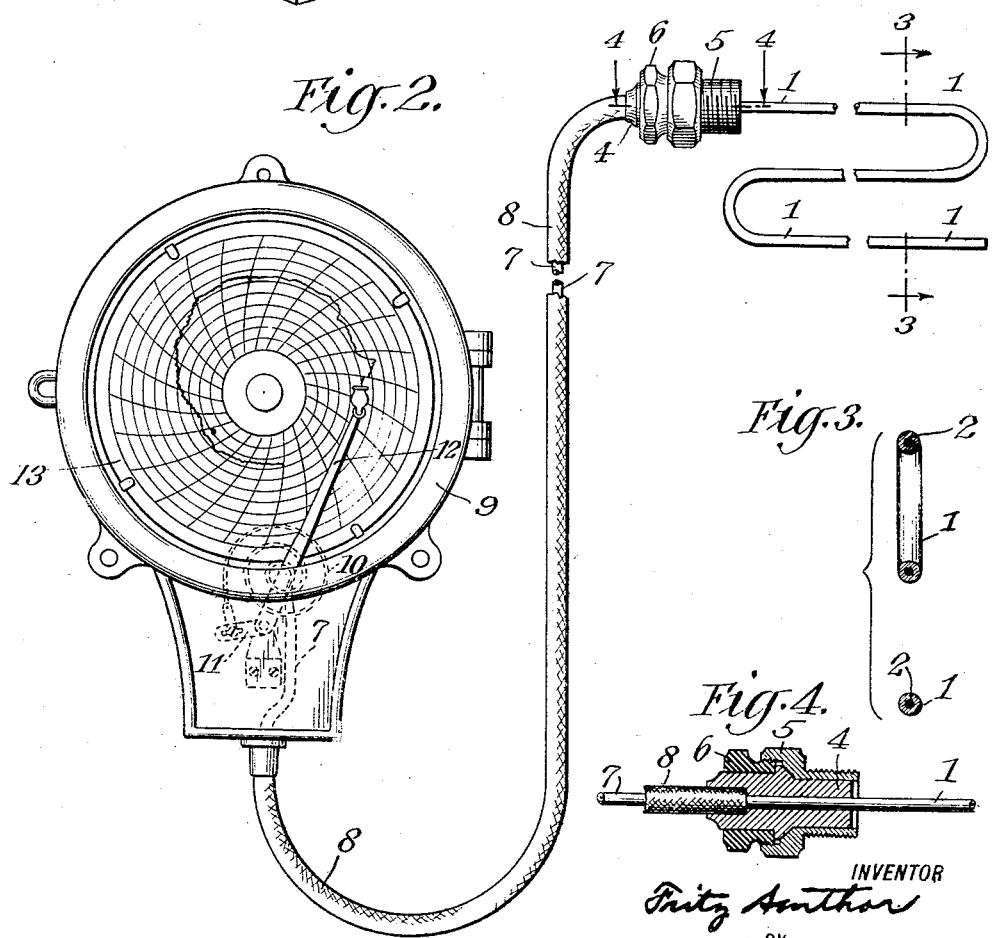
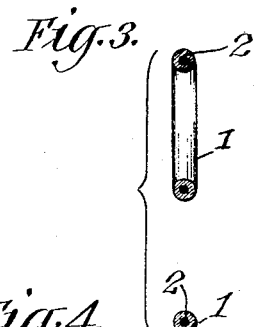
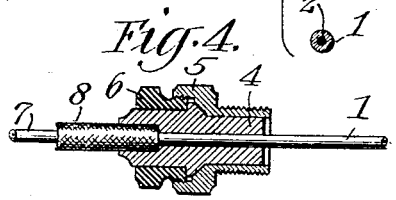
INVENTOR
Fritz Amthor
BY
Henry H. Williams
ATTORNEY

UNITED STATES PATENT OFFICE.

FRITZ AMTHOR, OF BROOKLYN, NEW YORK, ASSIGNOR TO THE SCHAEFFER & BUDENBERG MANUFACTURING COMPANY, A CORPORATION OF NEW YORK.

TEMPERATURE-OPERATED DEVICE.

1,331,553.   Specification of Letters Patent.   Patented Feb. 24, 1920.

Application filed February 16, 1916. Serial No. 78,576.

*To all whom it may concern:*

Be it known that I, FRITZ AMTHOR, a subject of the Emperor of Germany, residing at Brooklyn, in the county of Kings and State of New York, have invented certain new and useful Improvements in Temperature-Operated Devices, of which the following is a specification, reference being had therein to the accompanying drawings, forming part thereof.

My invention relates to temperature-operated devices, such as thermometers and temperature regulators, employed for indicating temperature, or for indicating and recording temperature, or for regulating or controlling temperature, and my invention particularly relates to the parts of such an instrument which are exposed to the temperature to be indicated, recorded or regulated.

The principal object of my invention is to obtain responsiveness to the average temperature of an extensive region, such, for example, as the various parts of an oven or kiln wherein different parts of the inclosed space are at different temperatures, and responsiveness to the variations of temperature at any one place might be misleading as to the prevailing temperature conditions. Other objects and advantages of my invention will hereinafter appear.

My invention includes a combined sensitive and transmission element comprising a long flexible metallic tube of substantially uniform internal diameter or cross-sectional area which contains a heat sensitive or thermo-expansive fluid, for example, a liquid, such as mercury, and this long flexible tube is left free and unrestrained so as to be compactly arranged for transportation and so as to be arranged for use in extended arbitrary form for traversing an extensive region and is connected to means responsive to the average of the temperatures to which the long flexible tube is subjected.

I shall now describe my invention with reference to the recording thermometer in which it is shown as embodied in the accompanying drawings and shall thereafter point out my invention in claims.

Figure 1 is a perspective view illustrating the application of my invention to a kiln or oven the average of the temperatures in which is desired to be indicated and recorded.

Fig. 2 is an enlarged diagrammatic elevation of the thermometer.

Fig. 3 is a further enlarged vertical section of the combined sensitive and transmission element on a plane indicated by the line 3—3 of Fig. 2 as viewed from the left.

Fig. 4 is a slightly enlarged longitudinal section, with the mercury-containing tube appearing in plan, on a horizontal plane indicated by the line 4—4 of Fig. 2 as viewed from above.

In the case of kilns or ovens such as are employed in the various industrial arts for drying or for baking, and the temperature of which is desired to be indicated, recorded or regulated, a serious difficulty heretofore has been that no single or localized point therein could be selected which would at all times, or even at any time, represent the average of the temperatures throughout such oven or kiln. My present invention provides means for utilizing the average of the temperatures at different points substantially throughout the furnace, kiln, oven or other similar extensive inclosure. The kiln, oven or other inclosure upon which my invention may be employed may vary in length or in other dimensions anywhere within practical limits and the device of my invention has been installed upon kilns and ovens varying in dimensions from a minimum length of ten feet up to a maximum of from one hundred to one hundred and fifty feet in length.

In the recording thermometer illustrated in the accompanying drawings as embodying my invention, there is employed a combined sensitive and transmission element shown as a long comparatively flexible metal tube 1 of small diameter and which contains a thin thread 2 of mercury. This long flexible metal tube 1 is substantially, or as near as may be made, of the same internal diameter throughout its length, as is indicated in Fig. 3, and is closed at its outer end. This tube 1 may be of any length found desirable according to the installation and also may be located or arranged in any desired or convenient place or position within the oven or kiln. In the installation illustrated in the drawings this mercury-containing tube 1 is shown as arranged within the upper part of a long kiln 3 and is shown as reversely bent twice upon itself so as to extend three times longitudinally of the kiln 1 in spaced relation transversely thereof. Assuming that the kiln 3 is one hundred and fifty feet in length, as above noted, then the length of the flexible tube 1 would be substantially four hundred and fifty feet. The long mercury-containing tube 1 may be supported at the inside of the kiln or oven 3 in any suitable way, for example, by means of hooks. This tube 1 is preferably of steel and is sufficiently flexible that it may be readily bent, this flexibility facilitating both shipment or transportation and its installation in an oven, kiln or the like. For example, the tube 1 is adapted to be compactly coiled or folded for transportation and in use is adapted to be uncoiled or unfolded and arranged in any desired or required extended arbitrary form for traversing an extensive region the average temperature of which is to control the device, for example, as shown in the drawings, to be indicated and recorded.

The long mercury-containing tube 1 passes to the outside of the kiln or oven 3 through a shouldered sleeve 4 which is held in place in a bushing 5 by a clamp nut 6. At the outside of the kiln 3 a usual mercury-containing transmission tube 7 is provided, this transmission tube 7 having a usual heat-insulating covering 8, the end of which is shown as inserted in and held by the sleeve 4. In the construction illustrated in the drawings, the mercury-containing transmission tube 7 forms an integral continuation of the tube 1 of the combined sensitive and transmission element hereinbefore described and its contained thread of mercury forms a continuation of the mercury thread 2 of the tube 1. The outer end of the tube 7 of the transmission element terminates in or is connected to a temperature recorder 9, the working parts of which may be of a usual or of any suitable construction, as is well understood in the art.

In the recording thermometer construction illustrated in the drawings, the mercury-containing transmission tube 7 is connected to or terminates in a tubular spring or Bourdon tube 10 forming an active or movement-producing element the free end of which is connected as shown to a pivoted lever arm 11 which transmits its movement to a coaxially pivoted pen arm 12 which gives an indication and also produces a permanent record upon a clock-operated record dial 13, as is usual in recording thermometers.

The transmission element, formed by the heat-insulated mercury-containing tube 7, forms only an intermediary connection between the combined sensitive and transmission elements, comprising the long flexible extended mercury-containing tube 1, and the tubular Bourdon spring 10 of the temperature recorder 9, forming the movement-producing or motor means, and obviously this transmission tube 7 may be of any required length, either longer or shorter, or the outer heat-insulated part thereof may be omitted and the outer end of the inner uncovered tube 1 then directly connected to the temperature recorder 7, or to other corresponding movement-producing means, and this could be done in cases where the tube 1 would emerge at the outside of the kiln or oven, such as 3, at a height convenient for access to and observation of a temperature indicator and recorder.

In the operation of the device, the Bourdon tube 10 will have impressed upon it and will respond to the amount of movement produced by the average of expansion or contraction at all points throughout the length of the long mercury thread 2 in the long extended flexible tube 1, for example, throughout a length of four hundred and fifty feet; and the pen arm 12 will correspondingly indicate and record upon the dial 13 the average of the varying temperatures throughout this extensive region in the kiln 3 traversed by the tube 1. That is to say, at places within the kiln 3 traversed by the tube 1 where the temperature is at a maximum, the mercury thread 2 in the tube 1 is expanded to the greatest or maximum extent, at other places in the kiln 3 where the temperature is at a minimum, the volume of the contained mercury thread 2 is likewise at a minimum, and at other points of intermediate temperature the mercury thread 2 expands to an intermediate extent. The result is that the average of the movements of the mercury thread 2 resulting from the several varying expansions or contractions is transmitted through the outer end of the tube 1 to the mercury thread of the connected heat-insulated mercury-containing tube 7 of the intermediary transmission element and is transmitted through the tube 7 of the transmission element to the hereinbefore described movement-producing means, shown as embodied in the temperature recorder 9, for there indicating and recording the average of the temperatures throughout all of the points in the kiln 3 which are traversed by the tube 1 of the combined sensitive and transmission element of the temperature-operated device, comprising the hereinbefore described recording thermometer.

It is obvious that various modifications may be made in the construction shown in the drawings and above particularly described within the principle and scope of my invention.

I claim:

1. A temperature-operated device comprising a long uniform flexible metallic tube containing a thermo-expansive liquid which maintains its liquid condition in use, forming a combined sensitive element and transmission element, such tube being adapted to be compactly arranged for transportation and to be arranged for use in extended arbitrary form so as to traverse an extensive region the average temperature of which is to control the device, and movement-responsive means connected with said tube and responsive to the expansion and contraction of the thermo-expansive liquid therein so as to be controlled by the average temperature of the extensive region traversed by the long flexible tube.

2. A thermometer comprising a long uniform flexible metallic tube containing a thermo-expansive liquid which maintains its liquid condition in use, forming a combined sensitive element and transmission element, such tube being adapted to be compactly arranged for transportation and to be arranged for use in extended arbitrary form so as to traverse an extensive region the average temperature of which is to be indicated, and temperature-indicating means connected with said tube and responsive to the expansion and contraction of the thermo-expansive liquid therein to indicate the average temperature of the extensive region traversed by the long flexible tube.

In testimony whereof I have affixed my signature.

FRITZ AMTHOR.